United States Patent [19]

Brimelow et al.

[11] Patent Number: 5,114,727
[45] Date of Patent: * May 19, 1992

[54] COATED PASTA FOR PROVIDING FIRM TEXTURE

[75] Inventors: Christopher J. Brimelow, New Milford; Jau Y. Hsu, Brookfield, both of Conn.; Michael S. Proctor, Louth, Great Britain

[73] Assignee: Nestec S.A., Vevey, Switzerland

[*] Notice: The portion of the term of this patent subsequent to Jul. 9, 2008 has been disclaimed.

[21] Appl. No.: 714,260

[22] Filed: Jun. 12, 1991

Related U.S. Application Data

[63] Continuation of Ser. No. 387,785, Aug. 1, 1989, Pat. No. 5,030,462.

[51] Int. Cl.$^5$ .................................................. A23P 1/08
[52] U.S. Cl. .................................. 426/302; 426/305; 426/557; 426/558
[58] Field of Search ............... 426/302, 305, 549, 557, 426/558, 589

[56] References Cited

U.S. PATENT DOCUMENTS

| | | | |
|---|---|---|---|
| 2,357,585 | 9/1944 | Galvin et al. | 426/589 |
| 3,433,650 | 3/1969 | Block et al. | 426/589 |
| 3,471,304 | 10/1969 | Handy et al. | 426/589 |
| 4,597,976 | 7/1986 | Doster et al. | 426/557 |
| 4,645,674 | 2/1987 | Lang et al. | 426/302 |

FOREIGN PATENT DOCUMENTS 53-066448 6/1978 Japan.
1-074958A 3/1989 Japan.

OTHER PUBLICATIONS

"Tagliatelle with Egg Sauce," The Complete Book of Pasta, Enrica and Vernon Jarratt, 1977, p. 341.

*Primary Examiner*—Donald E. Czaja
*Assistant Examiner*—Anthony Weier
*Attorney, Agent, or Firm*—Vogt & O'Donnell

[57] ABSTRACT

A pasta has a coating of a mixture of dried coagulated egg white and an edible oil for providing a firm texture to the pasta.

11 Claims, No Drawings

COATED PASTA FOR PROVIDING FIRM TEXTURE

CROSS REFERENCE TO RELATED APPLICATION

This is a continuation application of application Ser. No. 07/387,785, filed Aug. 1, 1989, now U.S. Pat. No. 5,030,462.

BACKGROUND OF THE INVENTION

The present invention relates to a process for the preparation of pasta.

It is very desirable to have a pasta which has a firm texture and this depends on the amount of water absorbed during processing. Conventional methods which are used to reduce the water absorption of pasta have certain disadvantages, and such methods include:
a) use of egg products and other protein materials—relatively large amounts needed;
b) use of emulsifiers—not natural products;
c) use of fibre materials—do not give a good texture;
d) use of thick pasta—does not give the desired shape and appearance;
e) acidic water blanching and use of acidic sauce—gives a brittle pasta texture and a poor eating quality; and
f) use of a viscous sauce—does not give the desired consistency and appearance.

SUMMARY OF THE INVENTION

We have found, surprisingly, that by coating the pasta with a mixture of egg white and edible oil, we can not provide not only a retorted or sterilised pasta with a firm texture but also provide an uncooked pasta that can be cooked in a microwave oven, or be baked or boiled for consumption starting from cold or warm water without disintegration of the structure or texture of the pasta.

Accordingly, the present invention provides a process for the preparation of a pasta which comprises forming an uncooked, partially cooked or precooked dough which may be in the form of a dough sheet or a pasta shape, coating the dough with a mixture of egg white and an edible oil, and then heating to coagulate, dry and bind the coating.

The coated pasta may be dried or related or partially dried.

DETAILED DESCRIPTION OF THE INVENTION

The dough sheet may be formed from uncooked dough by extrusion, sheeting, or sheeting/laminating. The dough which is coated may be:
a) a partially cooked or precooked dough sheet,
b) in the form of dehydrated pasta shapes made by extrusion or extrusion cooking of uncooked dough followed by dehydrating, or
c) in the form of dehydrated pasta shapes made by slitting and cutting an uncooked dough sheet followed by dehydrating.

The amount of the mixture of egg white and edible oil coated onto the dough may be from 1 to 25%, preferably from 3 to 15% and especially from 5 to 10% by weight based on the weight of the dough.

The weight ratio of egg white to oil in the coating mixture may be from 10:90 to 90:10 preferably from 20:80 to 80:20 and especially from 40:60 to 60:40.

The egg white and edible oil mixture is conveniently in liquid form and may be coated onto the dough by spraying or soaking. The egg product may be fresh or pasteurised.

A powdered egg white may be used but it should be rehydrated with water before mixing with oil.

The edible oil may be an animal or vegetable oil, for example, corn oil, cottonseed oil, soy bean oil. Partially hydrogenated vegetable oils may also be used.

DESCRIPTION OF PREFERRED EMBODIMENTS

In a first embodiment of the invention, a dough sheet is partially cooked or precooked, coated with a mixture of egg white and edible oil, pre-dried at a temperature of 80° to 200° C. for a period of from 20 to 0.5 minutes, to coagulate, dry and bind the coating, slit and cut into pasta shapes and then partially dried to a moisture content of from 2 to 60% water followed by retorting. The cooking of the dough sheet may be carried out by boiling, steaming, extrusion cooking or GOUDA drum cooking. The pasta shapes may be, for instance, noodle, fettuccine or linguine, etc. The partial drying of the pasta shapes may be carried out at a temperature from 95° to 110° C. over a period of from 5 to 15 minutes, preferably to a moisture content of from 20% to 35%.

Before retorting, the pasta may be premixed with other solid ingredients conventionally used in pastas and then filled into cans and sauced.

The retorting process may be carried out by stationary or rotary methods. Rotary retorting may be carried out at a temperature from 110° to 150° C. for a period of from 40 to 15 minutes, more usually from 30 to 20 minutes in the liquid medium which may be, for instance, a sauce type such as tomato or a soup type such as chicken broth. The amount of dough in the liquid medium is preferably from 20 to 50% by weight based on the total weight.

In a second embodiment of the invention, an uncooked dough sheet is slit and cut into pastas shapes, dehydrated, coated with a mixture of egg white and edible oil and further dried at a temperature of from 80° to 200° C. for a period of from 20 to 0.5 minutes to coagulate, dry and bind the coating. The pasta shapes may be noodle, fettuccine or linguine, etc.

The dehydration of the uncooked pasta shapes is usually conducted in conditions of high humidity and relatively low temperature over long periods of time, for example, 70–90% relative humidity at 40° to 60° C. for from 5 to 10 hours depending on the size and thickness of the pasta.

Preferably, the further drying of the coated pasta is carried out at a temperature of from 125° C. to 175° C. for a period of from 5 minutes to 1 minute.

The pasta of the second embodiment of the invention may be prepared for consumption by cooking in cold or warm water in a microwave oven. However, if desired, it may be retorted as for the pasta of the first embodiment.

In a third embodiment of the present invention an uncooked dough is extruded or extrusion cooked into pasta shapes, dehydrated, coated with a mixture of egg white and edible oil, further dried at a temperature of from 80° to 200° C. for a period of from 20 to 0.5 minutes to coagulate, dry and bind the coating followed by retorting. The pasta shapes may be noodles, spaghetti, rotini, elbow macaroni, etc.

The firmness of the retorted pasta of this invention is superior to that of raw, blanched pasta. The firmness is also better than either oil coated or egg product coated pasta. In addition, the firmness is better than using regular dried pasta (without coating), precooked or not precooked.

The process of this invention is applicable to wheat and non-wheat pasta products, e.g., rice, corn, etc. and, if desired, other materials conventionally used in making pastas may be added to the flour e.g. protein materials such as protein, whole egg, egg yolk, wheat gluten, soy flour or soy protein isolate, gums such as propylene glycol alginate or surfactants such as glyceryl monostearate.

EXAMPLES

The following Examples further illustrate the present invention.

In these Examples, the moisture content was determined by using COMPUTRAC moisture testing equipment. The pasta firmness was measured by weighing out 100 grams of retorted pasta and recording the peak force required to shear the pasta in an INSTRON Universal Testing Instrument by using a Framer Shear Test attachment (kg/g).

EXAMPLE 1

An extruded dough sheet containing 5.5% whole egg solid was partially cooked by water blanching at 95° C. for 1 minute, and then sprayed with 14% of a 50:50 mixture of fresh egg white and edible oil, predried at 95° C. for 10 minutes, cut into noodles 0.125 cm thick and dried further at 95° C. for 15 minutes to a moisture content of 25-30% H$_2$O.

The partially dried pasta was premixed with flavouring, spices and garnish ingredients, filled into cans and chicken broth sauce was added so that the amount of pasta was 30%. The pasta was retorted at 125° C. for 20 minutes in a rotary steriliser.

The retorted pasta's firmness was 0.180 kg/g and the moisture content was 75%. It had a good appearance. In comparison, a retorted wet/blanched pasta having the same egg content but without coating had a firmness of only 0.095 kg/g and a moisture content of 83%.

COMPARATIVE EXAMPLES A TO G

Retorted pastas were prepared in a similar manner to that described in Example 1 except that the coatings were different. The results are given in Table I below.

TABLE I

| Example | Coating | Retorted pasta's Firmness kg/g | Retorted pasta's Moisture | Retorted pasta's Appearance |
|---|---|---|---|---|
| A | None | 0.090 | 84% | Good |
| B | egg white/water | 0.095 | 83% | Good |
| C | oil | 0.090 | 82% | Good |
| D | egg white | 0.102 | 80% | Good |
| E | egg yolk/oil | 0.125 | 80% | Brownish and |
| F | whole egg | 0.150 | 79% | too much solid |
| G | whole egg/oil | 0.165 | 79% | on surface |

From the above results it can be seem that the pasta of the present invention prepared in accordance with Example 1 has a superior firmness and absorbs less moisture than any of the comparison pastas. In addition, its appearance is superior to the pastas of Comparative Examples E, F and G.

EXAMPLE 2

A dough was formulated from 70.70% Durum wheat flour, 17.30% whole egg liquid and 12.00% water and extruded into a sheet 0.125 cm thick. The dough sheet was cooked with saturated steam in a steam tunnel at a temperature of 95° C. for 100 seconds, then coated with 10% of a 50:50 mixture of corn oil and fresh egg white and dried at 102° C. for 8 minutes to a moisture content of 24%. The dried pasta was cut into noodle form which were mixed with twice their weight of a pumpable sauce having the following ingredients:

| | |
|---|---|
| water | 93.00% |
| corn oil | 3.80% |
| salt | 1.88% |
| Guar gum | 0.60% |
| CMC gum | 0.30% |
| Dextrose | 0.20% |
| Lecithin | 0.20% |
| Nutmeg | 0.02% |

The mixture was then retorted at 121° C. for 21 minutes. The noodles had a good texture, were not sticky, the pasta samples could be separated easily and had a firm texture.

COMPARATIVE EXAMPLE H

The dough sheet of Example 2 was cut into noodle form, cooked by super-heated steaming and dried to a moisture content of 24% before being further steam blanched, and finally mixed with the sauce and retorted as in Example 2. The noodles obtained were sticky and had a poor texture.

EXAMPLE 3

An uncooked pasta dough sheet was slit and cut into noodle shapes and dehydrated at 50° C. and 85% relative humidity over 6 hours. The noodle having a thickness of 0.075 cms and moisture content of 10% was coated with 8% of a 50:50 mixture of fresh egg white and corn oil and heated at 150° C. for 15 minutes. 50 parts of this coated pasta were added to 250 parts of cold water and cooked in a microwave oven at high power for 8 minutes. The water remained clear and the cooked pasta was firm.

COMPARATIVE EXAMPLE I

An uncoated unheated pasta was cooked in a microwave oven as in Example 3. The cooked pasta was soft and sticky and the water was cloudy.

EXAMPLES 4 AND 5

An uncooked pasta dough sheet prepared from a flour containing glyceryl monostearate was slit and cut into noodle shapes and dehydrated at 50° C., and 80% humidity over 7 hours. Two dehydrated noodle products containing glyceryl monostearate prepared as above having a thickness of 0.14 cms and moisture content of 10% were coated with 12% of a 50:50 mixture of fresh egg white and corn oil, heated at 150° C. for 1 minute and mixed with a sauce in an amount of 40 parts noodle to 100 parts sauce. The sauced noodle of Example 4 was immediately retorted while the sauced noodle of Example 5 was soaked for 30 minutes before retorting. Retorting was carried out in a rotary retort at 125°

C. for 21 minutes. Both pastas were firm, not sticky and had a good shape.

COMPARATIVE EXAMPLES J AND K

Two noodle products similar to those used in Examples 4 and 5 were treated in a similar manner except that they were not coated and heated. Both pastas were softer and more sticky than those of Examples 4 and 5 while the pasta which was soaked for 30 minutes in the sauce (J) was softer and more sticky than the pasta which was not soaked in the sauce (K).

EXAMPLES 6 TO 9

An uncooked pasta dough sheet was slit and cut into noodle shapes and dehydrated at 55° C. and 80% humidity over 8 hours to a moisture content of 10%. Four dehydrated noodle products having a thickness of 0.15 cms prepared as above were coated with 10% of a 50:50 mixture of egg white and corn oil, two using fresh egg (Examples 6 and 7) and two using pasteurised refrigerated egg white (Examples 8 and 9), and all were heated at 150° C. for 2 minutes and then mixed with sauce in a ratio of 50 parts noodle to 100 parts sauce. The sauced noodles of Examples 6 and 8 were immediately retorted while those of Examples 7 and 9 were soaked in the sauce for 30 minutes before retorting being carried out in a rotary retort at 125° C. for 21 minutes. The results are given in Table II below:

TABLE II

| Example | 6 | 7 | 8 | 9 |
|---|---|---|---|---|
| Soaking | no | yes | no | yes |
| Pasta stickiness | not sticky | not sticky | not sticky | not sticky |
| Pasta firmness | very firm | firm | very firm | firm |

COMPARATIVE EXAMPLES L AND M

A similar procedure to that carried out for Examples 6 to 9 was followed on two uncooked dehydrated noodle products which were uncoated, one of which was retorted immediately and the other soaked for 30 minutes before retorting. The results are given in Table III below:

TABLE III

| Example | L | M |
|---|---|---|
| Soaking | no | yes |
| Pasta stickiness | sticky | sticky, pasty |
| Pasta Firmness | softer than Example 6 or 8 | softer than L and Examples 6 to 9 |

The results of Examples 6 to 9 and Comparative examples L and M indicate that coated thick pasta can withstand prolonged soaking in sauce.

EXAMPLE 10

An uncooked dough was extruded into a rotini pasta and dehydrated at 55° C. and 80% humidity over 6 hours to a moisture content of 10%. These pastas were coated with 10% of a 50:50 mixture of egg white and corn oil, and heated at 150° C. for 2 minutes. The water absorption of this coated pasta was measured by soaking 10 g of the pasta in 200 ml water for 90 minutes, then weighing out the soaked weight. The soaked pasta weighed 15.5 g and remained firm.

COMPARATIVE EXAMPLES N, O, P AND Q

The rotini pastas used in Example 10 were treated in the following conditions;
N = No coating or heating
O = No coating but heated at 150° C. for 1 min.
P = Coated with only corn oil and heated at 150° C. for 1 min.
Q = Coated with only egg white and heated at 150° C. for 2 min.

10 g of each pasta was soaked in 200 ml water for 90 minutes, then weighed out. The weights and firmness of the soaked pastas were as follows;
N = 19.4 g, soft
O = 17.6 g, soft
P = 16.6 g, not as firm as Example 10 sample
Q = 19.0 g, soft The results of Example 10 and comparative Examples N, O, P and Q indicated that egg white/oil coated pasta can inhibit water absorption better than 1) uncoated/unheated, 2) heated, 3) oil coated/heated, 4) egg white coated/heated or pastas. These results also indicate that the coated pastas of Example 10 would have a more firm pasta texture after retorting than the pastas of comparative Examples N, O, P and Q.

We claim:
1. A pasta product comprising an uncooked pasta dough having a mixture of dried coagulated egg white and a edible oil coated thereon.
2. A product according to claim 1 wherein the mixture is coated on the dough in an amount of 1% to 25% by weight based upon a weight of the dough.
3. A pasta product according to claim 1 wherein the mixture is coated on the dough in an amount of 3% to 15% by weight based upon a weight of the dough.
4. A pasta product according to claim 1 wherein the mixture is coated on the dough in an amount of 5% to 10% by weight based upon a weight of the dough.
5. A pasta product according to claim 1 wherein the mixture coated on the dough has a weight ratio of egg white to oil of from 10:90 to 90:10.
6. A pasta product according to claim 1 wherein the mixture coated on the dough has a weight ratio of egg white to oil of from 80:20 to 20:80.
7. A pasta product according to claim 1 wherein the mixture coated on the dough has a weight ratio of egg white to oil of from 60:40 to 40:60.
8. A pasta product according to claim 1 wherein the mixture is coated on the dough in an amount of 3% to 15% by weight based upon a weight of the dough and the mixture coated on the dough has a weight ratio of egg white to oil of from 20:80 to 80:20.
9. A pasta product according to claim 8 wherein the ratio of egg white to oil is from 40:60 to 60:40.
10. A pasta product according to claim 8 wherein the mixture is coated on the dough in an amount of from 5% to 10% by weight.
11. A pasta product according to claim 9 wherein the mixture is coated on the dough in an amount of from 5% to 10% by weight.

* * * * *

UNITED STATES PATENT AND TRADEMARK OFFICE
CERTIFICATE OF CORRECTION

PATENT NO. : 5,114,727

DATED : May 19, 1992

INVENTOR(S) : Christopher J.B. BRIMELOW, et al.

It is certified that error appears in the above-identified patent and that said Letters Patent is hereby corrected as shown below:

On the title page, under the caption "Inventors" (item [75]), "Christopher J. Brimelow" should be --Christopher J.B. Brimelow--.

On the title page, under the heading "References Cited U.S. PATENT DOCUMENTS" (item [56]), line 3, "Handy" should be --Hamdy--.

Column 1, line 36, delete the first occurrence of "not".

Column 1, lines 49-50, delete "or related", and after "dried", insert --or retorted--.

Column 2, line 6, "product" should be --white--.

Column 3, line 5, "product" should be --white--.

Column 6, line 36 (line 2 of claim 3), after "of", insert --from--.

UNITED STATES PATENT AND TRADEMARK OFFICE
CERTIFICATE OF CORRECTION

PATENT NO. : 5,114,727
DATED : May 19, 1992
INVENTOR(S) : Christopher J.B. Brimelow, et al.

It is certified that error appears in the above-indentified patent and that said Letters Patent is hereby corrected as shown below:

Column 6, line 39 (line 2 of claim 4), after "of", insert --from--.

Column 6, line 51 (line 2 of claim 8), after "of", insert --from--.

Signed and Sealed this

Tenth Day of October, 1995

Attest:

BRUCE LEHMAN

*Attesting Officer*      *Commissioner of Patents and Trademarks*